United States Patent [19]
McKinley

[11] 3,923,911
[45] Dec. 2, 1975

[54] AR-VINYLBENZYL IODIDE

[75] Inventor: Suzanne V. McKinley, Wellesley, Mass.

[73] Assignee: The Dow Chemical Company, Midland, Mich.

[22] Filed: July 9, 1973

[21] Appl. No.: 377,480

[52] U.S. Cl............ 260/651 R; 260/669 R; 252/399
[51] Int. Cl.² ........................................ C07C 25/14
[58] Field of Search ................. 260/651 R, 651 HA

[56] References Cited
UNITED STATES PATENTS

| | | | |
|---|---|---|---|
| 2,780,604 | 2/1957 | Clark et al. ................. | 260/651 R X |
| 2,981,758 | 4/1961 | Hoffenberg .......................... | 260/651 |
| 3,274,077 | 4/1966 | Hoffenberg et al. ........ | 260/651 R X |

OTHER PUBLICATIONS

Rafikov et al., Dokl, Akad, Nauk SSSR 1968 181(4) 899–901.

Morrison et al., Org. Chem, Allyn & Bacon, Bostan, 1966, 2nd ed., 465.

Primary Examiner—Howard T. Mars
Attorney, Agent, or Firm—L. Wayne White

[57] ABSTRACT ar-Vinylbenzyl iodide is a new compound which was obtained by contacting ar-vinylbenzyl chloride with sodium iodide in acetone.

2 Claims, No Drawings

AR-VINYLBENZYL IODIDE

BACKGROUND OF THE INVENTION

The ar-vinylbenzyl chlorides and bromides are known compounds which are normally prepared by chlorinating or brominating vinyltoluenes or by chloromethylating or bromomethylating styrene. The ar-vinylbenzyl iodides have not been heretofore described in the literature to the best of applicant's knowledge and thus, presumably, cannot be prepared by analogous techniques.

SUMMARY OF THE INVENTION ar-Vinylbenzyl iodide is a new compound which corresponds to the general formula $CH_2=CH-C_6H_4-CH_2I$ and has three position isomers.

The ar-vinylbenzyl iodides are oily liquids which are useful as polymerization inhibitors and as reactive intermediates. They are substantially different from the corresponding ar-vinylbenzyl chlorides and bromides in that the subject class of iodides are useful at low concentrations in vinyl monomers (e.g. styrene) as polymerization inhibitors whereas the prior art ar-vinylbenzyl chlorides and bromides have been used as monomers in conventional vinyl addition polymerizations.

The subject ar-vinylbenzyl iodides are conveniently prepared by warming ar-vinylbenzyl chloride with sodium iodide in acetone at 40°–60° for 1 to 3 hours. An excess of sodium iodide is normally used to "force" the reaction but essentially any convenient ratio of reactants can be used. The sodium chloride by-product is insoluble. The desired product is then recovered by conventional techniques, such as fractional distillation under reduced pressure or by solvent extraction.

EXPERIMENTAL

An isomeric mixture of ar-vinylbenzyl chloride (15.3 g; 0.10 mole) containing approximately 40% para- and 60% meta-isomers was dissolved in 25 ml. acetone and added through a separatory tunnel to a solution of NaI (18.8 g; 0.125 mole) in 70 ml. acetone at 50°C. The solution was maintained at 50° for 70 minutes during which NaCl continued to precipitate. The suspension was filtered and a majority of the solvent was removed from the filtrate. To the filtrate was added 125 ml. ether to precipitate additional NaCl. The suspension was filtered again and the filtrate was evaporated on a rotary evaporator using a bath at 40°C to give the crude product as a dark oil. The crude product was distilled in a short path distillation apparatus and gave the following fractions, all with b.p. 67°–68°/0.1 mm Hg:

1. 1.43 g dark-colored oil;
2. 1.67 g dark oil;
3. 4.33 g slightly colored oil; and
4. 14.02 g pale pink oil.

Fractions 1 and 2 are 13% yield and fractions 3 and 4 are 75% yield. The total distilled product is 88%.

The nuclear magnetic resonance spectrum of this product was consistent with that expected for ar-vinylbenzyl iodide. Elemental analysis of fraction 3 gave: Calcd for $C_9H_9I$: C, 44.29; H, 3.72; I, 52.00. Found: C, 44.45; H, 3.48; I, 51.29.

The product is useful at low concentrations (e.g. 1–5 weight percent) in inhibiting the polymerization of styrene.

I claim:

1. Meta- or para- ar-vinylbenzyl iodide.
2. A mixture of meta-vinylbenzyl iodide and para-vinylbenzyl iodide.

* * * * *